US012612877B2

United States Patent

(12) United States Patent
Lee et al.

(10) Patent No.: US 12,612,877 B2
(45) Date of Patent: Apr. 28, 2026

(54) CONTRAIL SUPPRESSION

(71) Applicants: AIRBUS OPERATIONS LIMITED, Bristol (GB); AIRBUS DEFENCE AND SPACE LIMITED, Hertfordshire (GB)

(72) Inventors: Martin Lee, Bristol (GB); Anthony Denniss, Hertfordshire (GB); Matthew Stuttard, Hertfordshire (GB); Martin Agnew, Hertfordshire (GB)

(73) Assignees: AIRBUS OPERATIONS LIMITED, Bristol (GB); AIRBUS DEFENCE AND SPACE LIMITED, Hertfordshire (GB)

( * ) Notice: Subject to any disclaimer, the term of this patent is extended or adjusted under 35 U.S.C. 154(b) by 62 days.

(21) Appl. No.: 18/639,627

(22) Filed: Apr. 18, 2024

(65) Prior Publication Data

US 2024/0352897 A1 Oct. 24, 2024

(30) Foreign Application Priority Data

Apr. 19, 2023 (GB) ...................................... 2305729

(51) Int. Cl.
*F02C 9/28* (2006.01)
*F02C 9/40* (2006.01)

(52) U.S. Cl.
CPC .................. *F02C 9/28* (2013.01); *F02C 9/40* (2013.01); *F05D 2220/323* (2013.01); *F05D 2270/08* (2013.01); *F05D 2270/8041* (2013.01)

(58) Field of Classification Search
CPC ...... F02C 9/28; F02C 9/40; F02C 3/20; F02C 7/22; F05D 2220/323; F05D 2270/08; F05D 2270/8041; B64D 37/30
See application file for complete search history.

(56) References Cited

U.S. PATENT DOCUMENTS 8,763,368 B1 * 7/2014 Waggener ........... F02D 41/0235 60/299
11,585,278 B1 2/2023 Swann et al.
2013/0206912 A1 * 8/2013 Bright ...................... B64D 1/18 62/601

(Continued)

OTHER PUBLICATIONS

West, Halifax, NS: Regularly Spaced Gaps in Contrails [Ethiopian Flight 501], Jul. 26, 2017, Metabunk.org, p. 1 <https://www.metabunk.org/threads/halifax-ns-regularly-spaced-gaps-in-contrails-ethiopian-flight-501.8953/> (Year: 2017).*

(Continued)

*Primary Examiner* — Navid Z. Mehdizadeh
*Assistant Examiner* — Caitlin R McCleary
(74) *Attorney, Agent, or Firm* — Nixon & Vanderhye P.C.

(57) ABSTRACT

A method of suppressing contrails emitted by a propulsion system of an aircraft. A first fuel composition is fed into the propulsion system for a predetermined period. The expiry of the predetermined period is detected with a timer. Upon expiry of the predetermined period, a second fuel composition is fed into the propulsion system. The second fuel composition is more prone to cause contrails than the first fuel composition. Contrails generated by the propulsion system are detected as the second fuel composition is fed into the propulsion system. If a contrail is detected, the steps of the method are repeated.

20 Claims, 4 Drawing Sheets

(56) References Cited

U.S. PATENT DOCUMENTS

| | | | | |
|---|---|---|---|---|
| 2013/0343958 | A1* | 12/2013 | Swann | F02C 9/28<br>422/111 |
| 2015/0134151 | A1 | 5/2015 | Swann | |
| 2015/0284101 | A1* | 10/2015 | Swann | B64D 45/00<br>701/3 |
| 2023/0131160 | A1* | 4/2023 | Davalos | G08G 5/53<br>342/26 B |
| 2023/0323823 | A1* | 10/2023 | Swann | G06Q 10/0631<br>60/204 |
| 2024/0167426 | A1* | 5/2024 | Lincoln | F02C 9/28 |

OTHER PUBLICATIONS

Combined Search and Examination Report for GB Application No. 2305729.2 dated Nov. 21, 2023, 4 pages.

* cited by examiner

FIG. 1
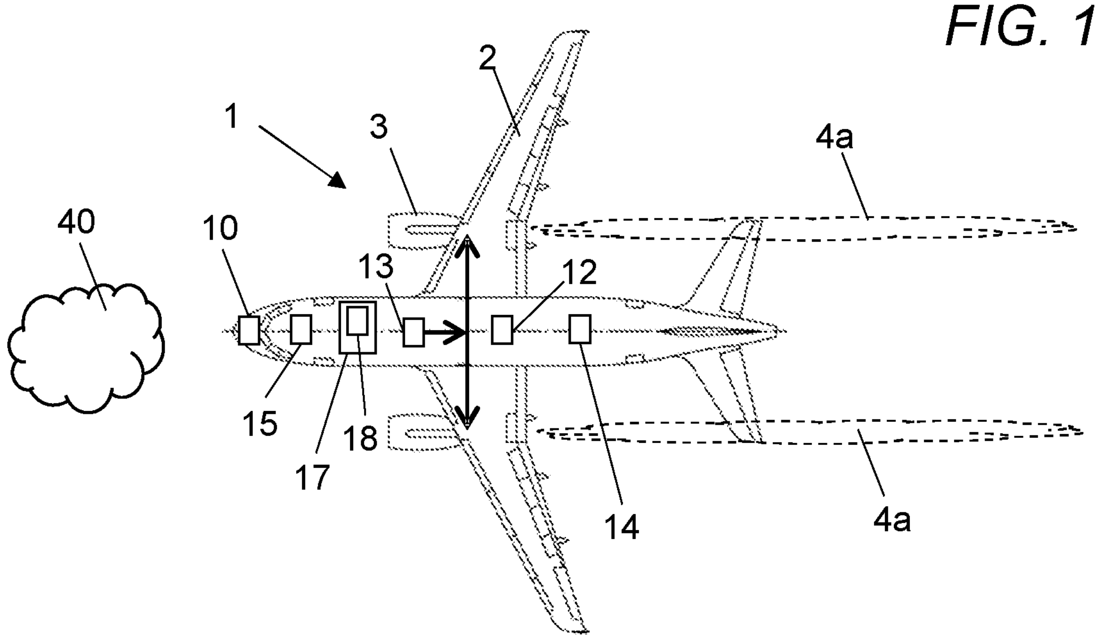
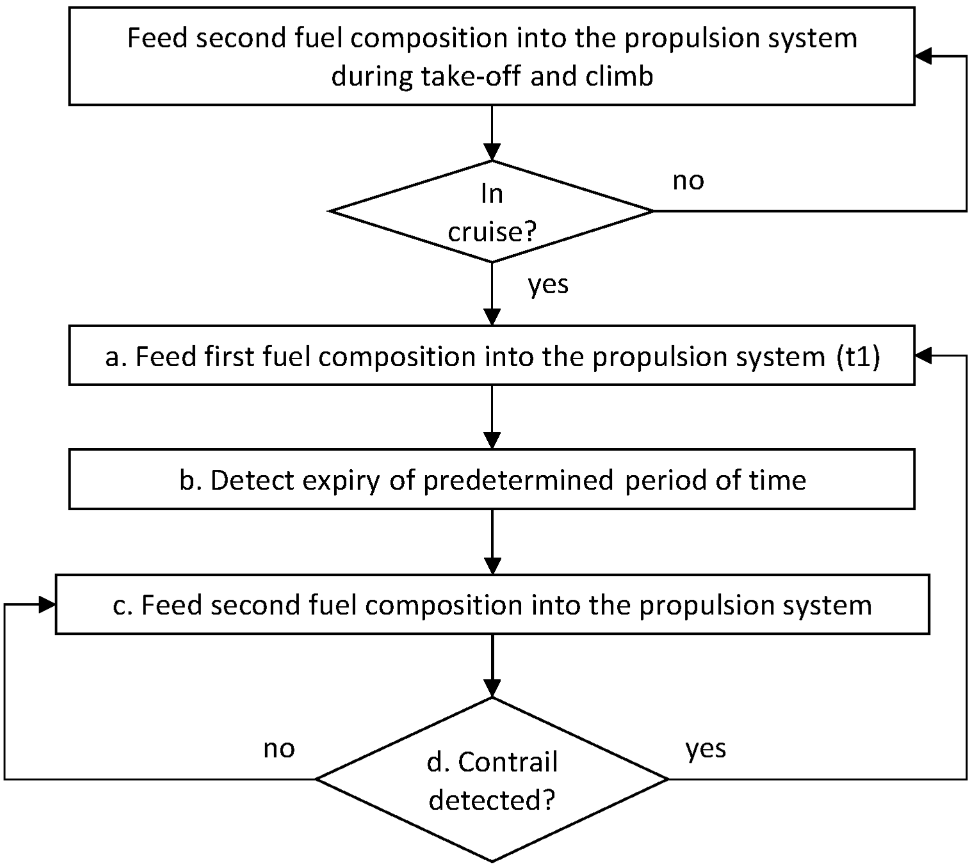
FIG. 2

Feed second fuel composition into the propulsion system

ISSR detected?    no yes a. Feed first fuel composition into the propulsion system (t1)

b. Detect expiry of predetermined period of time c. Feed second fuel composition into the propulsion system (t2)

no    d. Contrail detected?    yes

55    Ground station    50    11

10a    10a    1

CONTRAIL SUPPRESSION

RELATED APPLICATION

This application incorporates by reference and claims priority to United Kingdom patent application GB 2305729.2, filed Apr. 19, 2023.

TECHNICAL FIELD

The present invention relates to an aircraft and a method of contrail suppression.

BACKGROUND

The contrail production of an aircraft during flight may be influenced by multiple factors, such as the type of fuel used or atmospheric conditions. Contrail suppression measures, such as changing the flight path of the aircraft or using contrail suppressing fuel is used to reduce contrail production. However, contrail suppressing fuel is more expensive than conventional aircraft fuel. It is also undesirable for an aircraft to carry excessive quantities of both conventional fuel and contrail suppressing fuel because it adds to the overall weight of the aircraft. It is desirable to identify a device and associated method to address the aforementioned problems.

SUMMARY

A first aspect of the invention provides a method of suppressing contrails emitted by a propulsion system of an aircraft, the method comprising: step a of feeding a first fuel composition into the propulsion system for a predetermined period of time; step b of detecting expiry of the predetermined period of time with a timer; step c in which on detection of the expiry of the predetermined period of time, feeding a second fuel composition into the propulsion system, wherein the second fuel composition is more prone to cause contrails than the first fuel composition; and step d of detecting a contrail generated by the propulsion system as the second fuel composition is fed into the propulsion system in step c; wherein upon detecting the contrail in step d, steps a-c are repeated.

Optionally, the method further comprises detecting an absence of contrails as the second fuel composition is fed into the propulsion system in the repeat of step c, and upon detecting the absence of contrails, continuing to feed the second fuel composition into the propulsion system.

Optionally, upon detecting the contrail in step d, steps a-d are repeated two or more times.

Optionally, upon detecting the contrail in step d, steps a-d are repeated two or more times until an absence of contrails is detected as the second fuel composition is fed into the propulsion system in a repeat of step c.

Optionally, the contrail is detected in step d by a contrail sensor of the aircraft.

Optionally, the contrail sensor comprises a rear-facing camera.

Optionally, the contrail sensor generates contrail information which is transmitted from the aircraft to a ground-station or other aircraft.

Optionally, the method further comprises populating a database with the contrail information.

Optionally, the database provides a map identifying airspace more prone to contrail generation.

Optionally, the second fuel is fed into the propulsion system in step c. for less than the predetermined period of time.

Optionally, the first fuel composition comprises the second fuel composition combined with a contrail suppression fuel-additive.

Optionally, the first fuel composition comprises a biofuel.

Optionally, the method is automatically performed by a computer-controlled contrail suppression system.

Optionally, the method generates a segmented contrail comprising three or more vapour segments separated by gaps of substantially equal length.

A further aspect of the invention provides an aircraft comprising: a propulsion system; a timer; and a contrail suppression system configured to: a. feed a first fuel composition into the propulsion system for a predetermined period of time; b. detect expiry of the predetermined period of time with the timer; c. on detection of the expiry of the predetermined period of time, feed a second fuel composition into the propulsion system, wherein the second fuel composition is more prone to cause contrails than the first fuel composition; and d. monitor a presence or absence of contrail generated by the propulsion system as the second fuel composition is fed into the propulsion system in step c., wherein upon detecting a contrail in step d., the contrail suppression system is configured to repeat steps a-c, and upon detecting an absence of contrail in step d., the contrail suppression system is configured to continue feeding the second fuel composition into the propulsion system.

A further aspect of the invention provides a segmented contrail comprising three or more vapour segments separated by gaps of substantially equal length.

BRIEF DESCRIPTION OF THE DRAWINGS

Embodiments of the invention will now be described with reference to the accompanying drawings, in which:

FIG. 1 shows an aircraft comprising a contrail suppression system;

FIG. 2 shows a flow diagram of suppressing contrail generation during a cruise flight phase of the aircraft;

DETAILED DESCRIPTION

Figure 3A:
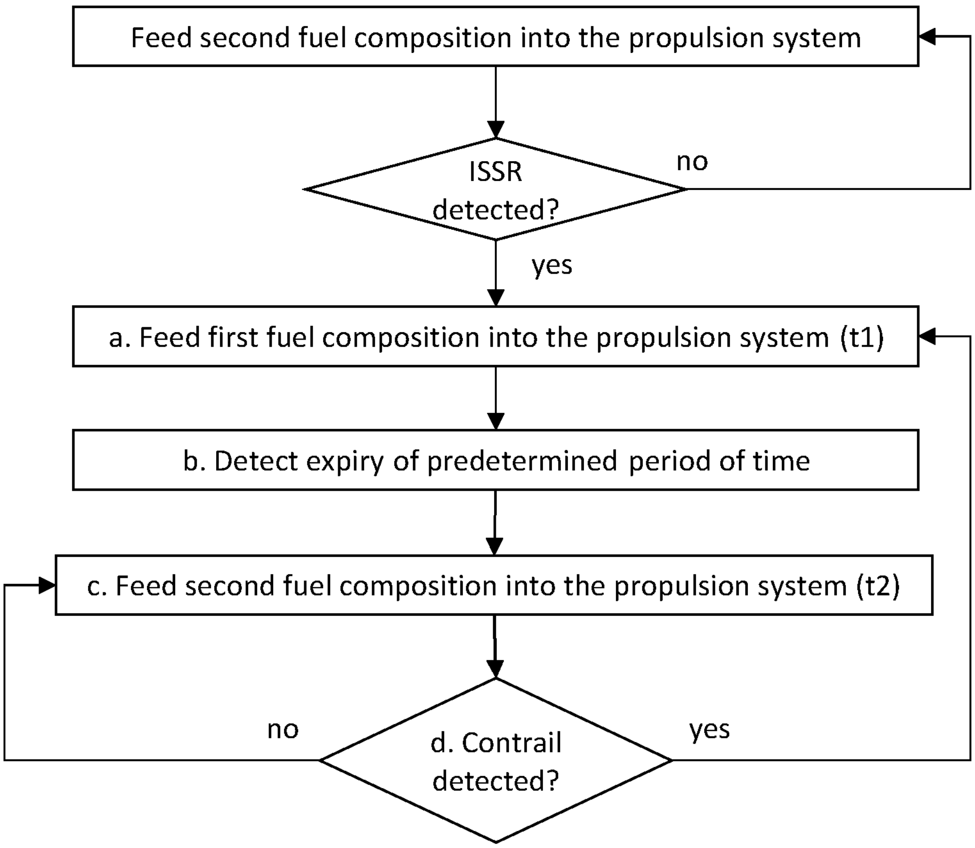
FIG. 3A shows a flow diagram of suppressing contrail generation as the aircraft approaches an ice super saturated region.

FIG. 1 shows an aircraft 1 in flight with a contrail suppression system. The aircraft 1 comprises a pair of wings 2 carrying a propulsion system in the form of jet engines 3. The engines 3 are fed with fuel from a fuel system comprising a first fuel tank 12 and a second fuel tank 13. The fuel tanks 12, 13 in FIG. 1 are only indicated schematically and can be located at any part of the aircraft 1.

The first fuel tank 12 contains a first fuel composition and the second fuel tank 13 contains a second fuel composition. The engines 3 can either be fed with the first fuel composition from the first fuel tank 12 or the second fuel composition from the second fuel tank 13.

The second fuel composition may be a standard fuel, such as JetA1, which is prone to cause condensation trails (referred to herein as "contrails") in certain atmospheric conditions. At the time of FIG. 1, the engines 3 are being fed with the second fuel composition from the second fuel tank 13. As shown, contrails 4*a* are generated by the engines 3 in FIG. 1.

The first fuel composition is less prone to cause contrails than the second fuel composition. The first fuel composition may comprise any suitable fuel which is less prone to cause contrails than the second fuel composition, such as biofuel or more specifically, Sustainable Aviation Fuel (SAF). SAF is less prone to causing contrails than JetA1 because SAF produces less soot.

The aircraft 1 comprises an avionics system indicated schematically at 17 which controls the fuel system. The avionics computer 17 forms part of a contrail suppression system of the aircraft 1 and is configured to automatically implement contrail suppression measures during the flight of the aircraft 1. In this example, the avionics computer 17 is arranged to switch the fuel system so that a different fuel composition is fed into the engines 3. The avionics computer 17 is arranged to switch between feeding the second fuel composition from the second fuel tank 13 into the engines 3 to feeding the first fuel composition from the first fuel tank 12 into the engines 3, and vice versa.

The aircraft 1 also comprises a sensing system comprising a forward-facing atmospheric sensor 15 and a rear-facing contrail sensor 14.

The atmospheric sensor 15 can be located onboard the aircraft 1 at any position in which it has an unimpeded forward-facing view. The atmospheric sensor 15 is configured to generate atmospheric information indicative of an atmospheric condition. The atmospheric sensor 15 communicates the generated atmospheric information to the avionics computer 17. By way of non-limiting example, the atmospheric condition may comprise a humidity, or any other indication of an ice super saturated region (ISSR) which will tend to cause contrails to be generated.

The contrail sensor 14 can be located onboard the aircraft 1 at any position in which it has an unimpeded rear-facing view. The contrail sensor 14 is configured to generate contrail information indicative of a presence or absence of contrails generated by the aircraft 1 and send contrail information to the avionics computer 17. By way of non-limiting example, the contrail sensor 14 may be a rear-facing camera which takes images of the exhaust plumes of the aircraft from the engine 3 and analyses the images to detect the presence or absence of contrails.

The contrail sensor 14 is configured to generate contrail information indicative of a presence or absence of contrails 4*a* generated by the engines 3. The contrail sensor 14 communicates the generated contrail information to the avionics computer 17.

The contrail suppression system of the aircraft 1 comprises the avionics computer 17, the engines 3 and the contrail sensor 14. The propulsion system of the aircraft (i.e. the engines 3) is more likely to generate contrails when the engines 3 are fed the second fuel type in certain weather conditions (for example, areas of high humidity) or at certain altitudes. The contrail suppression system of the aircraft 1 may therefore only be initiated during specific weather conditions, altitudes, or flight phases of the aircraft.

In the example shown in FIG. 2, the contrail suppression system of the aircraft 1 is initiated by entering the cruise phase of the aircraft. During take-off, initial climb and climb to cruise altitude of the aircraft 1, the avionics computer 17 feeds the second fuel composition into the engine 3. Contrails 4*a* are less likely to be generated by the aircraft 1 in these flight phases because the aircraft 1 is at a low altitude.

As the aircraft 1 enters the cruise phase, the contrail suppression system initiates a contrail suppression process by sequentially and repeatedly performing steps a-d shown in FIG. 2. The contrail suppression process is initiated as the aircraft 1 begins the cruise flight phase because contrails 4*a* are more likely to be generated at higher altitude.

At step a., the avionics computer 17 switches the fuel system from the second fuel tank 13 to the first fuel tank 12 so that the first fuel composition is fed into the engines 3. The first fuel composition is fed into the engine 3 for a predetermined period of time t1.

The first fuel composition acts as a contrail suppression measure, so that feeding the first fuel composition into the engine 3 prevents contrails 4*a* from being formed by the aircraft 1. However, it may not be necessary to continuously feed the first fuel composition into the engine 3 for the entire time that the aircraft 1 is in the cruise flight phase. This is because the probability of contrails 4*a* being formed by the aircraft 1 varies depending on other factors, such as the flight route and the atmospheric conditions. The contrail suppression system of the aircraft 1 is arranged to feed the first fuel composition into the engine 3 for the predetermined period of time (t1) before periodically monitoring for the presence or absence of a contrail 4*a* at step d, as discussed further below. This prevents the first fuel composition being used when it is not needed, thereby reducing the volume of first fuel composition used by the aircraft 1.

The expiry of the predetermined period of time (t1) is detected by a timer 18. In this example the timer 18 is part of the avionics computer 17, although it may be separate from the avionics computer 17. The predetermined period of time (t1) may be pre-programmed into the timer 18 or it may be manually input by an operator or ground personnel of the aircraft 1 through an input connected to the avionics computer 17.

The timer 18 is arranged to detect the expiry of the predetermined period of time (t1) at step b. and notify the avionics computer 17. On detection of the expiry of the predetermined period of time (t1) at step c. the avionics computer 17 switches the fuel system from feeding the first fuel composition into the engines 3, to feeding the second fuel composition into the engines 3.

As the second fuel composition is fed into the engines 3 in step c., the contrail sensor 14 continuously monitors whether contrails 4*a* are being generated by the aircraft 1. If the aircraft 1 is flying through an area or region with atmospheric conditions that result in contrails 4*a* being formed, the aircraft 1 will form contrails 4*a* as the second fuel composition is fed into the engines 3. By switching the fuel system to use the second fuel composition, the aircraft 1 can obtain real-time information regarding contrail formation of the aircraft 1.

When the contrail sensor 14 detects the presence of contrails 4*a* at step d., the contrail sensor 14 transmits the contrail information to the avionics computer 17. In response to the detection of a contrail at step d., the avionics computer 17 then repeats steps a-c by switching the fuel system back to feeding the first fuel composition into the engine 3 for a predetermined period of time t1 (in a repeat of step a), then repeating steps b-d. Feeding the first fuel composition into the engine 3 in the repeat of step a stops the formation of contrails 4*a*.

After step c. is repeated, the presence or absence of contrails 4*a* is monitored in a repeat of step d by the sensor 14. If contrails 4*a* are detected by the contrail sensor 14 again in the repeat of step d, then the steps a-d are repeated again. This loop continues until no contrail is detected in a repeat of step d.

If the contrail sensor 14 detects an absence of contrails 4*a* at step d., the contrail sensor 14 transmits the contrail information to the avionics computer 17. The avionics computer 17 continues to feed the second fuel composition into the engine 3 until a contrail is detected in step d. As the second fuel composition is being fed into the engine 3, the contrail sensor 14 continuously monitors the presence or absence of contrails 4*a* being generated by the engines 3.

The second fuel composition is typically fed into the engine 3 in step c. for less than the predetermined period of time t1. This is because firstly, any contrails 4*a* that are formed as the second fuel composition is fed into the engine 3 are quickly identified by the contrail sensor 14, which triggers the avionics computer 17 to switch back to step a. and begin feeding the first fuel composition into the engines 3. This prevents any resulting contrail being formed with a long and continuous vapour segment. Preferably, the time required to detect a contrail (t2) is less than 1% of the time period t1, so for each cycle the ratio t2/t1 between the time (t2) of contrail generation and the time (t1) of step a. is approximately 1/100. However, the time t2 may be any suitable length of time that is less than the time t1.

The avionics computer 17 is arranged to repeat steps a-d any number of times and in any combination depending on the formation of contrails 4*a*.

The steps a-d provide real-time feedback on the formation of contrails 4*a* by the aircraft 1 without requiring additional external information. As described above, the contrail suppression system of the aircraft 1 prevents the aircraft 1 from using the first fuel composition in areas or regions of the flight path that would not produce contrails 4*a* if the second fuel composition was used. The contrail suppression system therefore allows the aircraft 1 to optimise the volume of the first fuel composition used by the aircraft 1, thereby reducing the volume of the first fuel composition required in the first fuel tank 12. This may reduce fuel cost because the first fuel composition may be more expensive than the second fuel composition.

Figure 5:
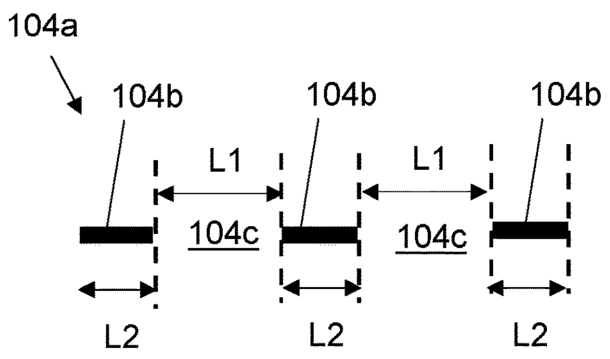
FIG. 5 shows an exemplary segmented contrail.

FIG. 5 shows a segmented contrail 104*a* produced by performing the contrail suppression method described in steps a-d. The segmented contrail 104*a* comprises a plurality of visible vapour segments 104*b* arranged in a substantially straight line and separated by gaps 104*c* containing no visible vapor. The vapour segments 104*b* have a length L2 that may vary from segment to segment or may be substantially the same from segment to segment as shown in FIG. 5.

The gaps 104*c* have a length L1 that is determined by the time t1 and the ground speed of the aircraft. Assuming that the ground speed is substantially constant as the segmented contrail 104*a* is generated, then the gaps 104*c* will have substantially equal lengths L1. As discussed above, if the time ratio t2/t1 is of the order of 1/100 then the length ratio L2/L1 will also be of the order of 1/100.

The segmented contrail 104*a* shown in FIG. 5 comprises three vapour segments 104*b* separated by two gaps 4*c*. However, the segmented contrail 104*a* may comprise any number of vapour segments 104*b* and gaps 104*c*. The segmented vapour trail 104*a* will terminate when no contrail is detected in a repeat of step d.

In the examples above, the predetermined time t1 is assumed to be the same for each instance of steps a and b. In other examples the predetermined time t1 may vary—for instance being different for different flight phases. Typically the predetermined time t1 is the same for at least two repeats of steps a and b, resulting in a segmented contrail as in FIG. 5 with gaps of the same length L1.

In the example shown in FIG. 2, the contrail suppression process is initiated by the aircraft 1 entering cruise. In other examples, the aircraft 1 may be arranged to suppress contrails 4*a* as the aircraft 1 enters an ice super saturated region (ISSR) 40, as shown in FIG. 3A. The atmospheric sensor 15 is used to detect the ISSR 40 ahead of the aircraft 1. This causes the avionics computer 17 to begin the contrail suppression process as shown in FIG. 3A. The steps a-d shown in FIG. 3A are identical to the steps a-d described in FIG. 2 and will not be described again.

Figure 3B:
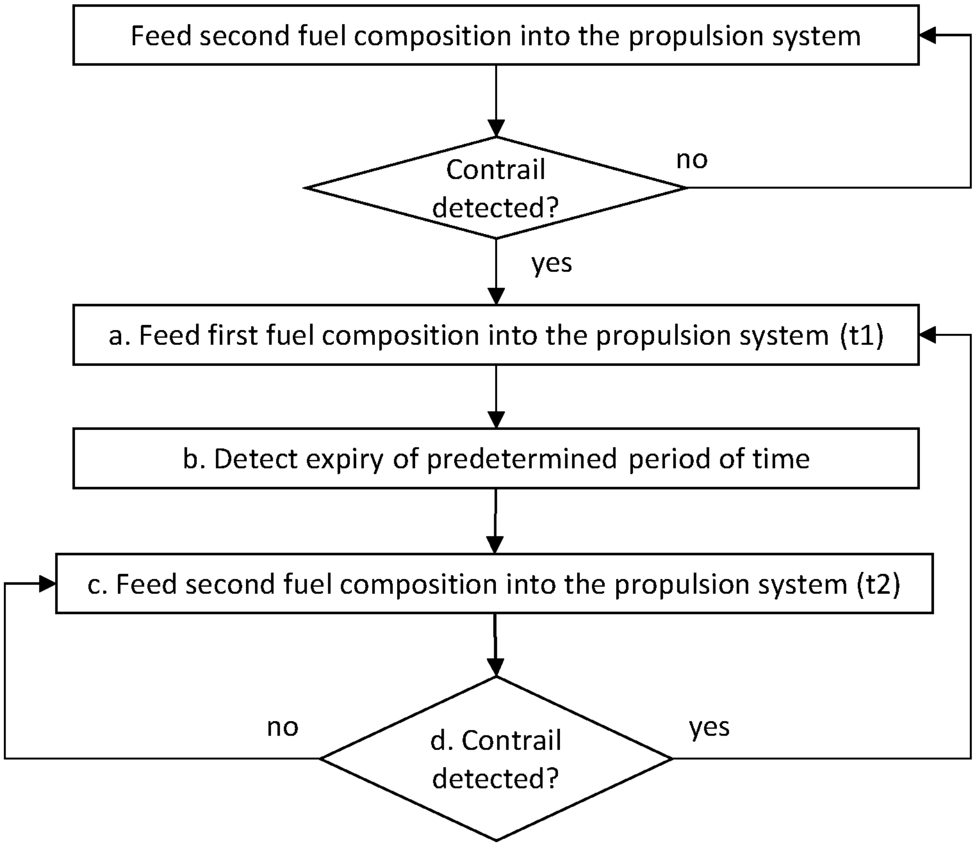
FIG. 3B shows a flow diagram of suppressing contrail generation when contrails are detected by the aircraft.

An alternative method of initiating contrail suppression is shown in FIG. 3B. In this case, the contrail suppression process of step a-d is initiated by the detection of contrails at any time, regardless of whether the aircraft is in cruise or an ISSR has been detected.

The contrail suppression method may also be initiated manually by a pilot.

FIGS. 2, 3A and 3B show one type of contrail suppression measure (i.e. where the avionics computer 17 changes the fuel system from a second fuel type in the second fuel tank 13 to a first fuel type in the first fuel tank 12) that can be implemented by the aircraft 1. A different type of contrail suppression measure which can be used in step a., and each repeat of step a., is to feed a contrail suppression fuel-additive into the fuel line from the second fuel tank 13 without switching to another fuel tank. In this case, the fuel system switches between first and second fuel compositions—the first fuel composition being JetA1 with contrail suppression fuel-additive, the second fuel composition being JetA1 without contrail suppression fuel-additive.

The aircraft 1 may further comprise a transmitter 10 that is configured to transmit data from the aircraft 1 during flight of the aircraft to a ground station 50, or to another aircraft 11 (shown in FIG. 4) which may be on the ground or in flight. In this example, the transmitter is shown to be in the nose of the aircraft 1. However, the transmitter 10 may be located in any part of the aircraft 1.

The contrail sensor 14 may be connected to the transmitter 10 in the aircraft 1. The contrail information detected by the contrail sensor 14 may be stored on the aircraft 1 or may be transmitted to a ground station 50 or the other aircraft 11 via a transmission 10*a* from the transmitter 10. The transmissions 10*a* may be received continuously or intermittently during flight of the aircraft 1. The transmissions 10*a* may contain contrail information indicative of the presence or absence of contrails 4*a* generated by the aircraft 1.

Typically, the contrail information is transmitted from the aircraft 1 during the flight of the aircraft, although optionally it may be obtained from the aircraft after the flight of the aircraft 1.

Figure 4:
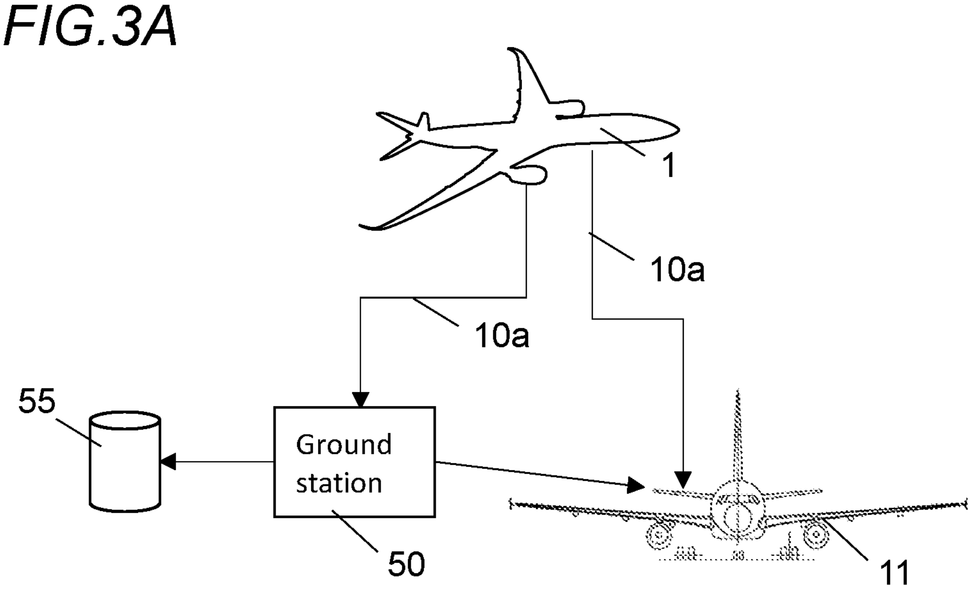
FIG. 4 shows a system for obtaining contrail information.

The ground station 50 or other aircraft 11 may use the contrail information received via the transmission 10*a* to populate a database 55, shown schematically in FIG. 4. The database 55 may be used to store the contrail information obtained from the aircraft 1. The database 55 may also receive additional information from the transmission 10*a*, such as the flight path, altitude of the aircraft 1, or atmospheric information from the atmospheric sensor 15.

Figure 6:
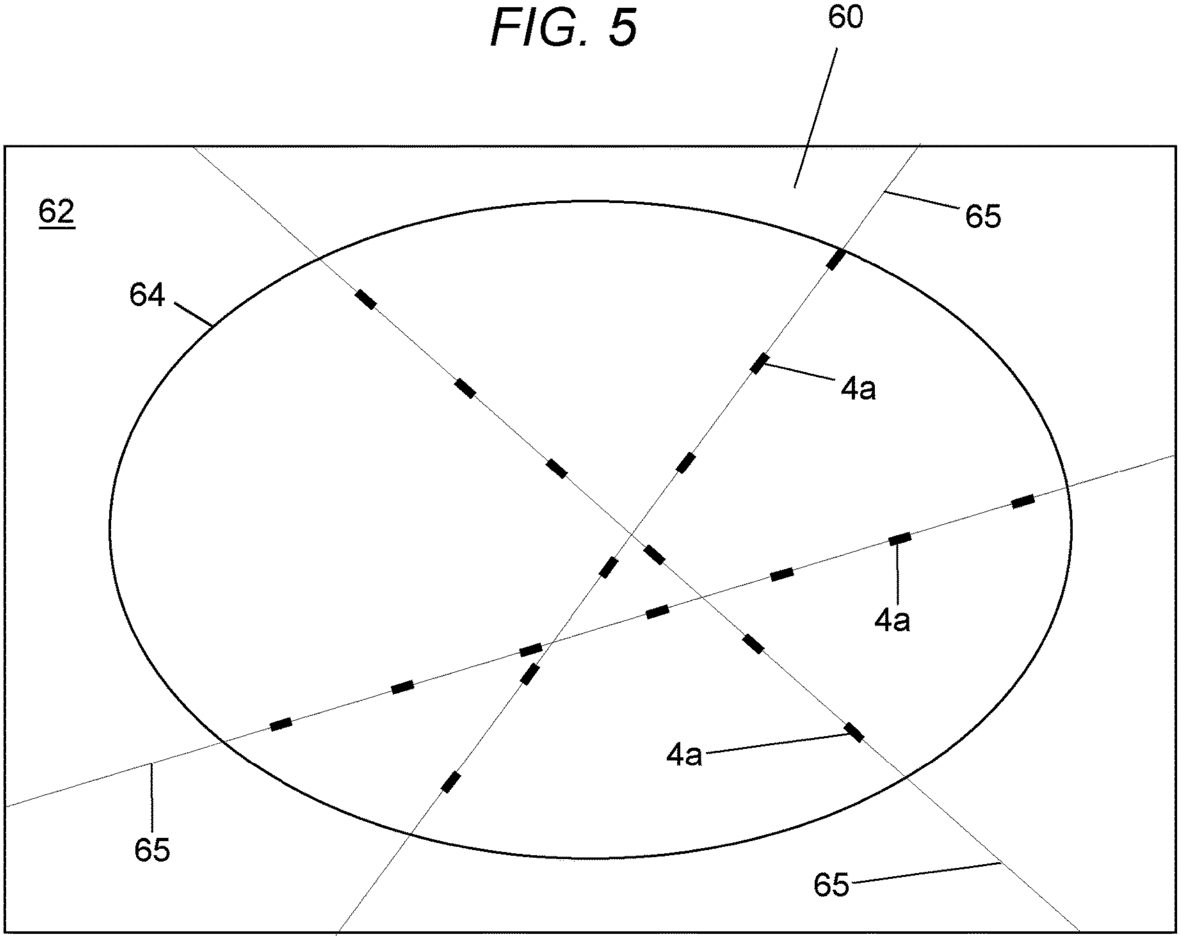
FIG. 6 shows an exemplary map identifying airspace more prone to contrail generation.

The database 55 may be configured to provide a map 60, shown in FIG. 6. As shown, the map 60 provides a three-dimensional view of a volume of airspace 62 and a volume of interest identified in the map 60 by a boundary 64. The map 60 shows three flight paths 65 passing through the volume of interest 64.

The volume of interest 64 identifies a volume of the airspace that is more prone to contrail generation than the surrounding airspace 62. In the example shown in FIG. 6, three segmented contrails 4*a* are schematically identified in the volume of interest 64, each segmented contrail 4*a* lying on a respective flight path 65. The parts of the flight paths 65 outside the volume interest 64 have no segmented contrails 4*a*.

The map 60, including the volume of interest 64, may be used to plan flight routes for subsequent aircraft that are yet to pass through the airspace 62. The volume of interest 64 can be used to inform aircraft how much of the first fuel composition may be required to complete a specific flight route with minimal contrail production.

The database 55 may be transmitted to other aircraft 11 via the ground station 50, or the other aircraft 11 may only use the contrail information provided via the transmission 10*a* to prepare its flight route.

Methods of suppressing contrails emitted by a propulsion system of an aircraft are disclosed in FIGS. 1-6. The methods comprise: a. feeding a first fuel composition into the propulsion system 3 for a predetermined period of time t1; b. detecting expiry of the predetermined period of time t1 with a timer 18; c. in response to detection of the expiry of the predetermined period of time, feeding a second fuel composition into the propulsion system 3, wherein the second fuel composition is more prone to cause contrails than the first fuel composition; and d. detecting a contrail 4*a* generated by the propulsion system as the second fuel composition is fed into the propulsion system in step c. In response to the detection of a contrail in step d., steps a-c are repeated.

Also disclosed is an aircraft 1 comprising a propulsion system 3; a timer 18; and a contrail suppression system configured to: feed a first fuel composition into the propulsion system for a predetermined period of time t1; detect expiry of the predetermined period of time t1 with the timer 18; on detection of the expiry of the predetermined period of time t1, feed a second fuel composition into the propulsion system, wherein the second fuel composition is more prone to cause contrails than the first fuel composition; and monitor a presence or absence of contrail generated by the propulsion system as the second fuel composition is fed into the propulsion system in step c.; wherein upon detecting a contrail in step d., the contrail suppression system is configured to repeat steps a-c, and upon detecting an absence of contrail in step d. the contrail suppression system is configured to continue feeding the second fuel composition into the propulsion system.

Also disclosed is a segmented contrail 104*a* comprising three or more vapour segments 104*b* separated by gaps 104*c* of substantially equal length.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

We claim:

1. A method of suppressing contrails emitted by a propulsion system of an aircraft, the method comprising:

feeding a first fuel composition into the propulsion system for a predetermined period of time;

detecting expiry of the predetermined period of time with a timer;

on detection of the expiry of the predetermined period of time, feeding a second fuel composition into the propulsion system, wherein the second fuel composition is more prone to cause contrails than the first fuel composition;

monitoring for a presence or an absence of a contrail generated by the propulsion system while the second fuel composition is fed into the propulsion system;

in response to the monitoring detecting the presence of a contrail, repeating the feeding of the first fuel consumption, the detecting the expiry of the predetermined period and the feeding of the second fuel, and in response to the monitoring detecting the absence of a contrail, continuing the feeding of the second fuel composition to the propulsion system and continuing the monitoring for the presences or the absence of a contrail.

2. The method of claim 1, further comprising:

detecting an absence of contrails as the second fuel composition is fed into the propulsion system in the repeating of the detection of the expiry of the predetermined period of time, and upon the detecting the absence of contrails, continuing to feed the second fuel composition into the propulsion system.

3. The method of claim 1, wherein the repeating is performed at least twice.

4. The method of claim 1, wherein the upon detecting the contrail, the detecting the expiry of the predetermined period and the feeding of the second fuel are repeated two or more times until an absence of contrails is detected as the second fuel composition is fed into the propulsion system.

5. The method of claim 1, wherein the contrail is detected by a contrail sensor of the aircraft.

6. The method of claim 5, wherein the contrail sensor comprises a rear-facing camera.

7. The method of claim 5, wherein the contrail sensor generates contrail information transmitted from the aircraft to a ground-station or other aircraft.

8. The method of claim 7, further comprising populating a database with the contrail information.

9. The method of claim 8, wherein the database includes a map identifying airspace prone to contrail generation.

10. The method of claim 1, wherein the feeding of the second fuel into the propulsion system is performed for less than the predetermined period of time.

11. The method of claim 1, wherein the first fuel composition comprises the second fuel composition combined with a contrail suppression fuel-additive.

12. The method of claim 1, wherein the first fuel composition comprises a biofuel.

13. The method of claim 1, wherein the feeding of the first fuel consumption, the detecting the expiry of the predetermined period and the feeding of the second fuel are performed automatically by a computer-controlled contrail suppression system.

14. The method of claim 1, wherein the repeating the feeding of the first fuel consumption, the detecting the expiry of the predetermined period and the feeding of the second fuel generates a segmented contrail comprising three or more vapor segments separated by gaps.

15. The method of claim 14, wherein the gaps in the three or more vapor segments each have an equal length.

16. The method of claim 1, wherein the detection of the presence of a contrail during the monitoring step occurs during a second period which is less than the predetermined period of time.

17. The method of claim 1, wherein the detection of the presence of a contrail during the monitoring step occurs during a second period which is less than one percent of the predetermined period of time.

18. An aircraft comprising:

a propulsion system;

a timer; and a system configured to:

feed a first fuel composition into the propulsion system for a predetermined period of time;

detect expiry of the predetermined period of time with the timer;

on detection of the expiry of the predetermined period of time, feed a second fuel composition into the propulsion system, wherein the second fuel composition is more prone to cause contrails than the first fuel composition; and monitor a presence or absence of contrail generated by the propulsion system while the second fuel composition is fed into the propulsion system;

in response to detecting the presence of a contrail, the system is configured to repeat the feeding of the first fuel composition and the detecting the expiry of the predetermined period and the feeding of the second fuel, and in response to detecting the absence of a contrail, the system is configured to continue the feeding of the second fuel composition into the propulsion system and the monitoring of the presence or the absence of a contrail.

19. A method comprising: flying an aircraft by generating thrust from an engine mounted on the aircraft, operating the engine by feeding a first fuel composition into the engine for a predetermined period of time; upon the expiry of the predetermined period feeding a second fuel composition into the engine, wherein the second fuel composition is more prone to cause contrails than the first fuel composition, and sequentially repeating at least three times the feeding of the first fuel composition and the feeding of the second fuel composition, and generating, by the engine of the aircraft, a segmented contrail comprising three or more vapor segments separated by gaps.

20. The method of claim 19, wherein the gaps in the three or more vapor segments each have an equal length.

* * * * *